United States Patent

Powell et al.

[11] Patent Number: 5,197,584
[45] Date of Patent: Mar. 30, 1993

[54] METHOD AND APPARATUS FOR ORIENTING PREDOMINATELY FLAT ARTICLES

[75] Inventors: Donald L. Powell, Fort Collins; Daniel W. Buehler, Windsor; David E. Carson, Fort Collins, all of Colo.

[73] Assignee: CBW Automation, Inc., Fort Collins, Colo.

[21] Appl. No.: 715,570

[22] Filed: Jun. 14, 1991

[51] Int. Cl.⁵ .................................................. B65G 47/24
[52] U.S. Cl. .................................. 198/380; 198/395; 198/399; 198/400
[58] Field of Search ............... 198/380, 395, 399, 400

[56] References Cited

U.S. PATENT DOCUMENTS

| | | | |
|---|---|---|---|
| 2,771,981 | 11/1956 | McKune | 198/30 |
| 2,778,478 | 1/1957 | Brook | 198/107 |
| 3,334,729 | 8/1967 | Kosrow | 198/395 |
| 3,599,829 | 8/1971 | Aidlin et al. | 221/160 |
| 3,734,268 | 5/1973 | Burger et al. | 198/33 |
| 3,874,740 | 4/1975 | Hurd | 198/380 |
| 3,960,293 | 6/1976 | Sweet et al. | 221/258 |
| 4,007,854 | 2/1977 | Ervine | 221/167 |
| 4,093,062 | 6/1978 | Sjogren | 198/380 |
| 4,138,009 | 2/1979 | Strong | 198/396 |
| 4,266,653 | 5/1981 | Mergi | 198/392 |
| 4,379,504 | 4/1983 | Carle et al. | 198/455 |
| 4,401,203 | 8/1983 | McDonald et al. | 198/392 |
| 4,699,261 | 10/1987 | Nesin | 198/398 |
| 4,705,156 | 11/1987 | Boling | 198/392 |
| 4,709,798 | 12/1987 | Herzog | 198/380 |
| 4,746,002 | 5/1988 | Wysocki | 198/367 |
| 4,779,714 | 10/1988 | Madden | 198/399 |
| 4,799,613 | 1/1989 | Adamson | 198/395 |
| 4,828,100 | 5/1989 | Hoppmann et al. | 198/392 |
| 4,863,007 | 9/1989 | Eitzinger et al. | 198/399 |
| 4,878,575 | 11/1989 | McDonald et al. | 198/391 |
| 4,884,678 | 12/1989 | Graham et al. | 198/392 |
| 4,907,686 | 3/1990 | Cotic | 198/399 |
| 4,964,500 | 10/1990 | Gooden | 198/380 |

Primary Examiner—Joseph E. Valenza
Attorney, Agent, or Firm—Luke Santangelo; Robert W. Diehl

[57] ABSTRACT

An apparatus for handling a plurality of lids or other predominately flat articles having two discrete sides, such as a top and bottom, delivering them in a common orientation, which includes a conveyor system for carrying the articles along the apparatus from an inlet end to a final discharge end and an air jet nozzle which directs compressed air to engage at least some of the articles to change their orientation. The conveyor system may include a number of orienting surfaces with at least a single disjoined area to provide conditions for article orientation, or re-orientation in specialized cases. The appropriate arrangement of any two of these surfaces provides varying degrees of automated flipping. Various forces, such as, but not limited to, air, vacuum and gravity, either separately or in combination, may assist in the flipping process. Such forces are selectively enabled by the detection of an improperly oriented article. Other elements may include variable speed vacuum belts—for preventing overlap of subsequent articles—and stabilizing air jets—for preserving orientation of properly oriented articles, and for preventing overlap.

43 Claims, 7 Drawing Sheets

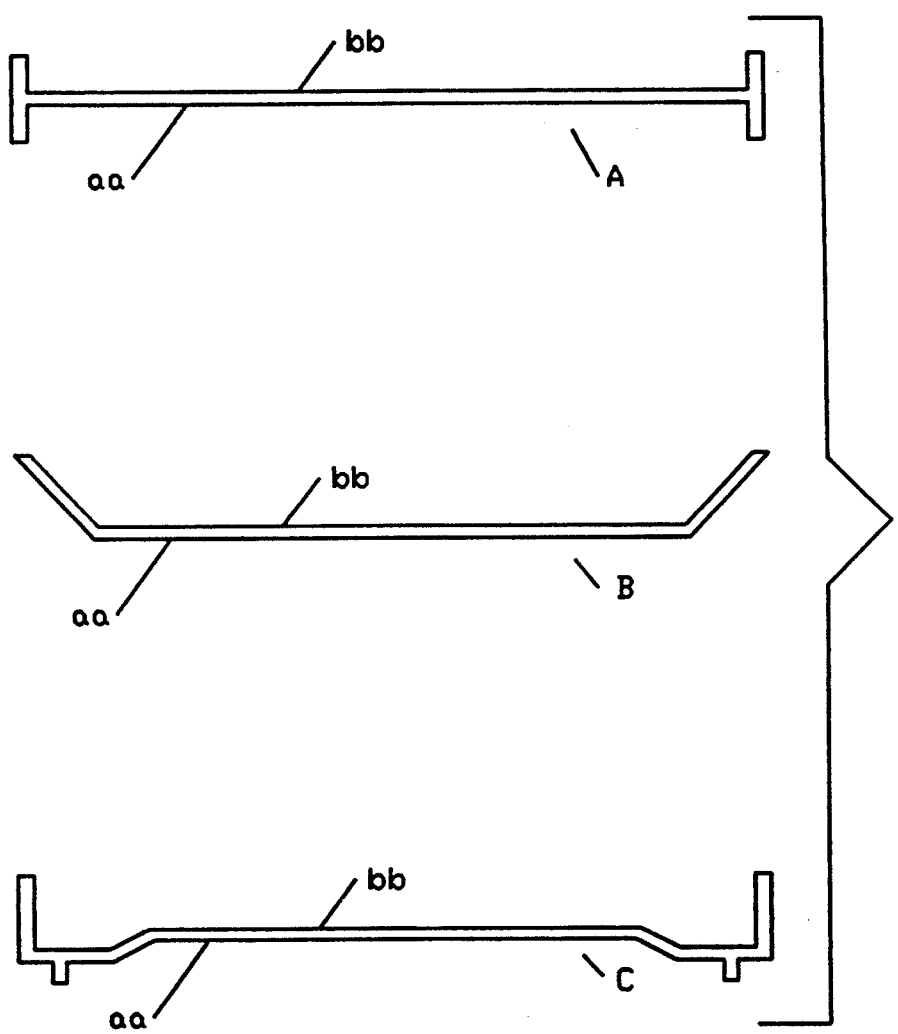

METHOD AND APPARATUS FOR ORIENTING PREDOMINATELY FLAT ARTICLES

I. FIELD OF THE INVENTION

The present invention relates to automated devices which accept randomly oriented, repetitively manufactured articles. More particularly, the present invention relates to techniques and apparatus for orienting flat articles so that similar sides of each of these articles may be oriented in the same direction.

II. BACKGROUND OF THE INVENTION

To enhance competition, many manufacturing companies seek to simplify various aspects of their businesses through automation. This is particularly true for those concerned with bulk manufacturing such as injection-molded manufacturing, where each step of production may yield a number of articles. Often, the rate at which such articles can be produced is limited only by how fast these articles can be removed, collected or dispersed. In view of this challenge automators have concentrated on fewer steps and more reliable methods. The present invention has succeeded in accomplishing both for the orientation of articles such as lids, closures and the like.

While the automated process for orientating objects such as lids goes back to at least the early 1970's, many of the devices of the prior art which claim to orient actually work by an accept/reject technique. This is clearly illustrated by U.S. Pat. Nos. 3,599,829 to Aidlin, et al., and 4,093,062 to Sjögren. Both of these inventions separate properly oriented articles from improperly oriented articles by forcing the latter back into a holding bin or such. These improperly oriented articles are rejected in hope that they will correctly orient in their fall. In a rapid production process this could potentially cause an undesirable backup or at least add steps to the process.

A second technique used in the art is the indiscriminate flipping of articles. This is best illustrated by U.S. Pat. Nos. 3,734,268 to Burger, et al. and 4,709,798 to Herzog. Burger supplies a constant air flow sufficient to flip upside down lids, while those correctly oriented deflect the air flow. Obviously, the strength of the indiscriminate air flow is very important, ensuring only improperly oriented lids are flipped. The Herzog invention employs essentially the same process for flipping the articles, but also combines the accept/reject technique. After the articles are flipped (or not) a sensor determines if any are still improperly oriented, triggering a blast of air to blow them back into a rotating bowl. Again, random processes are employed in hopes that proper orientation will occur. This indiscriminate process is also undesirable for some article designs where the continuous air may flip such articles irrespective of orientation.

A further consideration, in view of the Burger and Herzog patents, is the force which must be exerted upon each article. In such designs air flow must be great enough to overcome the weight of the article, while at the same time be small enough to have no effect on properly oriented articles. Thus, narrow margins can be presented.

The present invention, in both its apparatus designs and methods, recognizes and addresses these concerns and overcomes the limitations perceived by those skilled in the art by presenting a design which, among other aspects, allows for the flipping of only improperly oriented articles through selective application of a force on those articles. Particularly, the present invention allows utilization of a force less in magnitude than the weight of the article to correctly orient flat articles quickly and reliably. Other designs which attempt to orient flat articles merely reject those which are improperly oriented, or indiscriminately apply a force in an effort to flip no more and no less than those improperly oriented. The prior art demonstrates the substantial attempts made by those skilled in the art to fill the need for a quality orientor. Instead of understanding the true problem, manufacturers have coped with the inherent limitation to some of these devices and methods. Apparently, all because there was a failure to fully understand the problems of properly orienting articles such as lids, and the like.

III. SUMMARY OF THE INVENTION

The present invention discloses a device to operate in conjunction with molding machines, or other manufacturing processes such as, but not limited to printing, packaging, and the like. The device provides a reliable and efficient method for orienting predominately flat articles, such as lids, closures, etc. Rather than supplying a system which affords only an incremental increase in performance and design over the prior art, the present invention utilizes techniques which were not previously considered to achieve leaps in performance compared to the prior art. It is also designed to accommodate different requirements of various manufacturing operations, allowing each to construct a custom system which incorporates the basic orienting principles of the present invention. This serves to optimize cost efficiencies for both the manufacturer and installer, optimize the reliability of the product, and optimize production concerns.

In general terms, the invention involves both methods and numerous embodiments of an apparatus. Each of the elements of this system achieve several different objects which, when combined, act to achieve the mentioned leaps in performance. In one embodiment, the invention discloses an air solenoid which supplies a sufficient force to flip an improperly oriented article without any need for later acceptance or rejection of the article. In another embodiment, the corrective force is applied by the vacuum of the conveying surface combined with the designed radius of the surface's discharge end. In still other embodiments, the present system discloses the discontinuation of a stabilizing force to flip improperly oriented articles.

Importantly, the invention breaks from several time-honored traditions in orientation techniques. While drawing from some of the important conditions demanded of these devices for providing an effective orientor, the invention expands upon these conditions in an effort to provide an efficient and reliable device. With prior detection of improperly oriented articles, flipping forces can be selectively engaged to avoid accidental flipping of correctly oriented articles. By recognizing and utilizing the unrestrictive constraints of free space the invention achieves its goals.

Accordingly, the present invention provides an automatic article orienting method and device which selectively applies a force to improperly oriented articles. The stated device acts to sense the article's orientation before issuing a corrective force to those improperly oriented. The present device may include stabilizing forces for properly oriented articles. In addition, the device utilizes two conveying surfaces arranged in a manner to facilitate inversion of the improperly oriented articles.

One object of the present invention is to provide a design which correctly orients a plurality of consecutively aligned flat articles. It is a goal of this design to be capable of changing the orientation of only improperly oriented articles. Hence, it is a further object of the present invention to detect improperly oriented articles and subject these articles to a force capable of flipping them about an axis.

It is also an object of the present invention to provide a design which allows a plurality of consecutively aligned flat articles to be correctly oriented without overlapping subsequent articles. Hence, it is an object that articles which are flipped should not land atop previous articles. It is an object that each article should retain its initial position and a proper spacing with any surrounding articles.

Another object of the present invention is to provide a design which re-orients a plurality of consecutively aligned flat articles. It is a goal of this design to be capable of changing the orientation of all previously oriented articles. Such is the need in the instance where the articles are oriented one way for printing, but need to be re-oriented the other way for packaging, or some other use.

It is an object of one embodiment of the present invention to flip all the articles by supplying a downward force on each as they pass between conveying surfaces. It is still another object of the present invention that the force necessary to change the orientation of each article is significantly less than that for prior art devices. It is therefore an object of the present invention to provide a design which allows forces such as gravity to act upon the articles to assist flipping of each article.

It is yet another object of the present invention to provide a design which avoids additional steps. Through improved reliability of the flipping step (the process which correctly orients each article) no accept or reject steps are needed, as in the prior art.

Still another object of the present invention is to provide a design which allows accommodation of various article shapes and sizes. It is an object of the present invention that many of its elements be adjustable to allow for correct orientation of very large to very small articles of any weight or shape.

Still a further object of the present invention is to allow orientation to occur about various axes. By providing a design with properly positioned air jets, the article may be flipped about virtually any and every axis. Such conditions may be necessary with, for instance, non-circular articles.

Naturally, other objects of the present invention are disclosed throughout various areas of the specification and claims.

IV. BRIEF DESCRIPTION OF THE DRAWINGS

The following descriptions and referenced drawings are for selected preferred embodiments of the present invention. Naturally, changes may be made to the disclosed embodiments while still falling within the scope and spirit of the present invention and the patent granted to its inventors.

FIG. 6 is a cross-section of only three of the various article designs the present invention is able to orient.

V. DESCRIPTION OF THE PREFERRED EMBODIMENT

Figure 1:
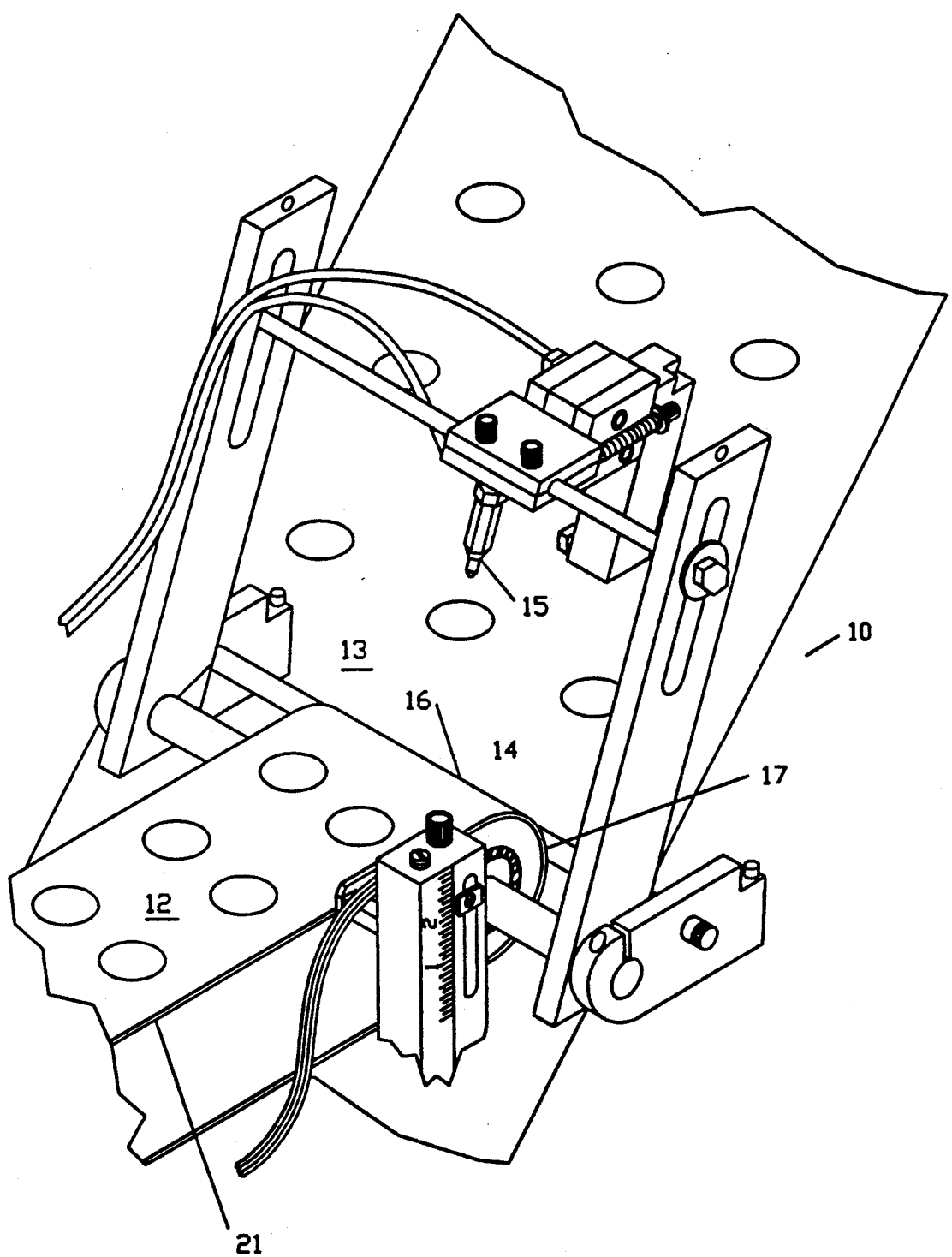
FIG. 1 is a perspective view of one embodiment of the present invention.

As can be seen from the various drawings, the basic concepts of the present invention may be embodied in many different ways. The general device as shown in all figures shall be indicated by the number (10), while similar elements shall be similarly indicated by like numbers throughout the drawings. FIG. 1 shows one embodiment of flipper apparatus (10) having first surface (12) for conveying each article toward space (14) where orientation may be changed, and second surface (13) for receiving each properly oriented article. Articles (20) shown in the subsequent figures are lids, or closures, such as those used to cover an open container, however, they may be any number of different objects which are predominately flat, and may be manufactured of a variety of materials, such as metal, plastic, and the like. "Predominately flat" describes the general stature of article (20). Many articles are designed with ridges, skirts and such, but may be considered to be "predominately flat".

While the designs and concepts disclosed focus upon and may find use for the orientation of lids, closures and the like, it may also obviously find use in a wide variety of other applications. It should therefore be understood that while the field of application of the invention is discussed in the limited context, the scope of protection afforded is not intended to be so limited.

Figure 4:
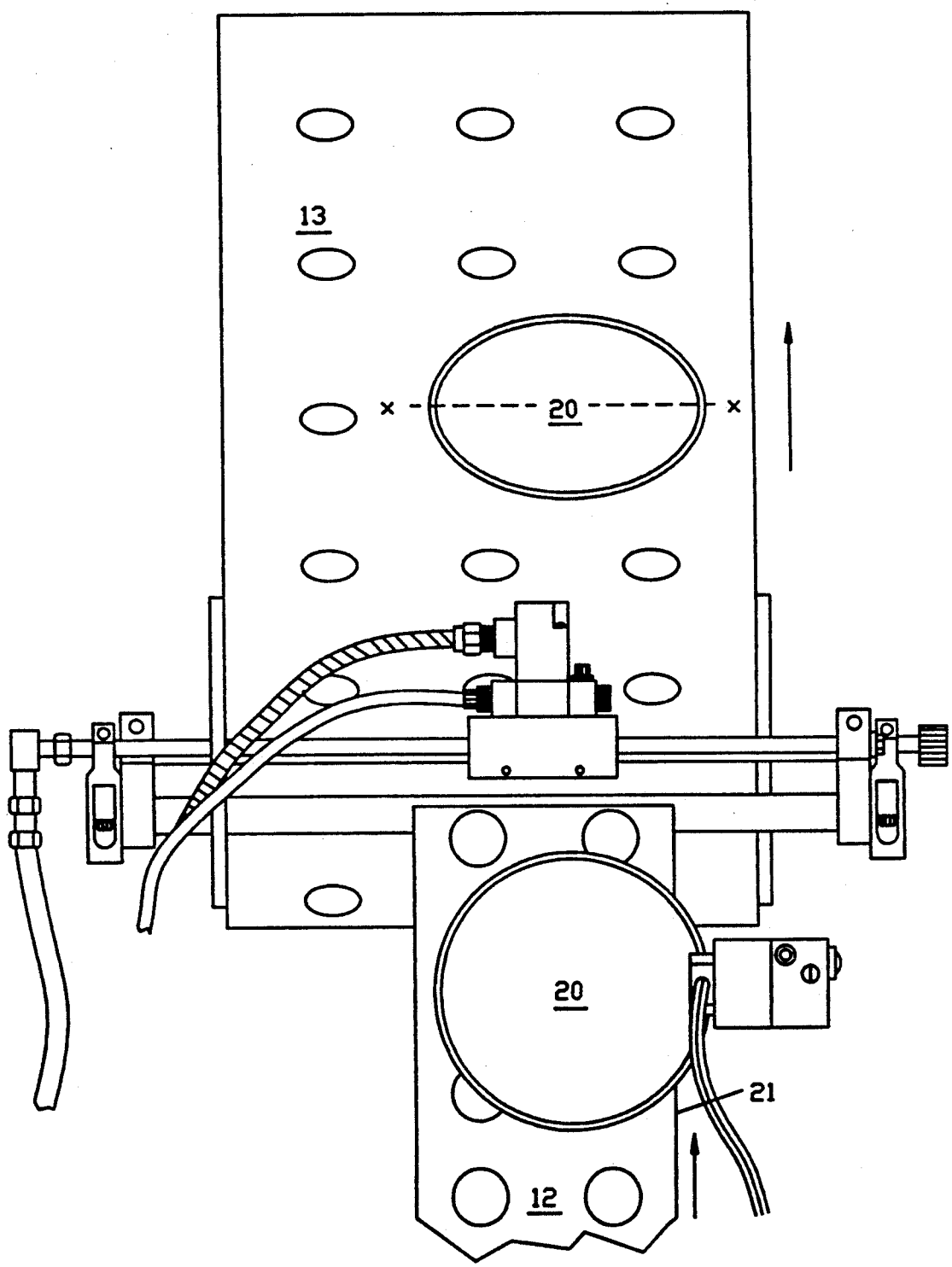
FIG. 4 is a top view of one embodiment showing the position of an article as it approaches an electronic sensor.

Referring now to FIG. 4, it can be seen that each article is aligned in a single file on first surface (12). This is accomplished by the means for positioning. The means for positioning serves to guide each article into a proper position so that the orientation of each article (20) may be determined. The present embodiment positions each article (20) approximately ⅛" over edge (21) of first surface (12). Naturally, other positioning techniques may be used to accomplish the same tasks.

The position of each article (20) on surface (12) is held firmly by a vacuum force. In the present embodiment first surface (12) is a vacuum belt. These belts are well-known by those skilled in the art to which the present invention pertains. The necessary force of the vacuum to hold each article is, of course, dependent upon the weight of article (20).

With respect to second surface (13), many elements are very similar to first surface (12). Second surface (13) is preferably a vacuum surface, however, for a more critical reason. In certain applications, the angle of inclination of surface (13) may be relatively steep (>25°). This incline may cause various types of articles to slip backwards if they are not held firmly to surface (13). Such slippage could cause overlap of articles (20) as they are moved onto second surface (13), greatly hindering any ensuing process, whether it be stacking of articles (20), printing on articles (20), or the like.

Figure 2:
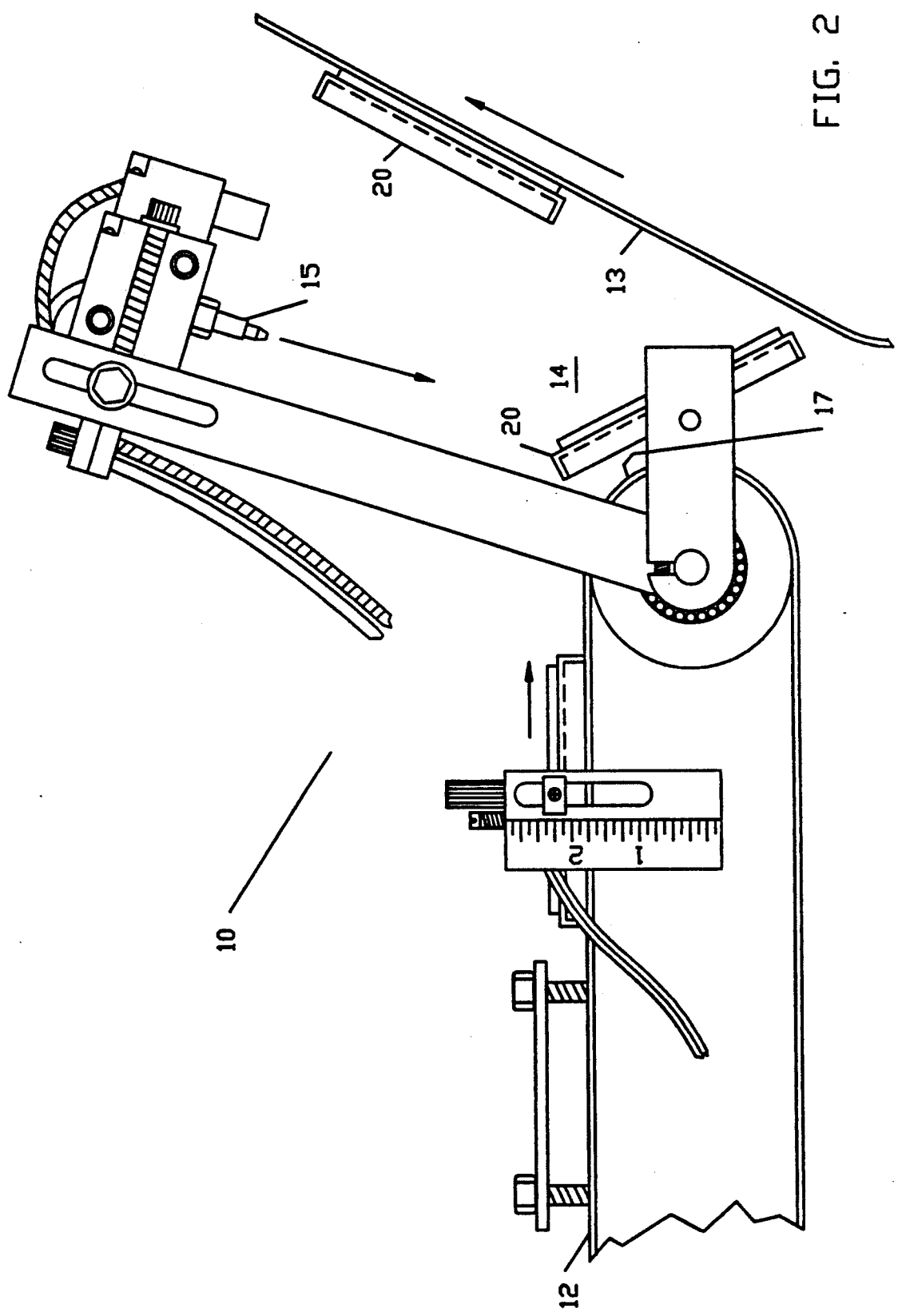
FIG. 2 is a side view of the embodiment shown in FIG. 1 illustrating the activity of an upper air jet in response to an improperly oriented article.

The arrangement of second surface (13) to first surface (12), in the present embodiment, is approximately 40°. Notice in FIGS. 2 and 3 that space (14) exists between the discharge end of first surface (12) and the receiving end of second surface (13). Space (14), among other things, serves to allow a means for transporting each article from surface (12) to surface (13) to function. In this embodiment, such means is gravity and may include air forces. The size (depth and width) of space (14) is completely adjustable. Certain circumstances, such as large articles, will require a greater space (14) than small articles, for instance. Similarly, as will be more completely explained later, circumstances which utilize the application of alternate flipping forces—those other than the air supply used in the present invention—may require a greater space (14).

Referring again to FIGS. 2 and 3, the means for selectively changing orientation and the flipping forces of the present invention can be more easily understood. By separating first surface (12) from second surface (13) in the manner disclosed, the present invention is able to flip improperly oriented articles about a variety of axes. The flipping action may be accomplished by a variety of means and methods. Air solenoid (15), or any other suitable means for issuing an air supply, is one such means. By exerting a force upon the surface of an improperly oriented article (20) as it enters space (14), these articles may be flipped about axis X—X (shown in FIG. 4) thus changing their orientation. This is possible because space (14) allows article (20) unrestricted movement. In fact, flipper apparatus (10) works with gravity allowing article (20) to "nose dive" slightly as it passes over radius (17) and enters space (14). This tendency permits a small air burst from air solenoid (15) directed onto the surface of article (20) to flip each improperly oriented article. While prior art devices have needed to supply a force which sufficiently overcomes the weight of the article to flip improperly oriented articles 180°, the present invention is not so constrained.

Figure 7A:
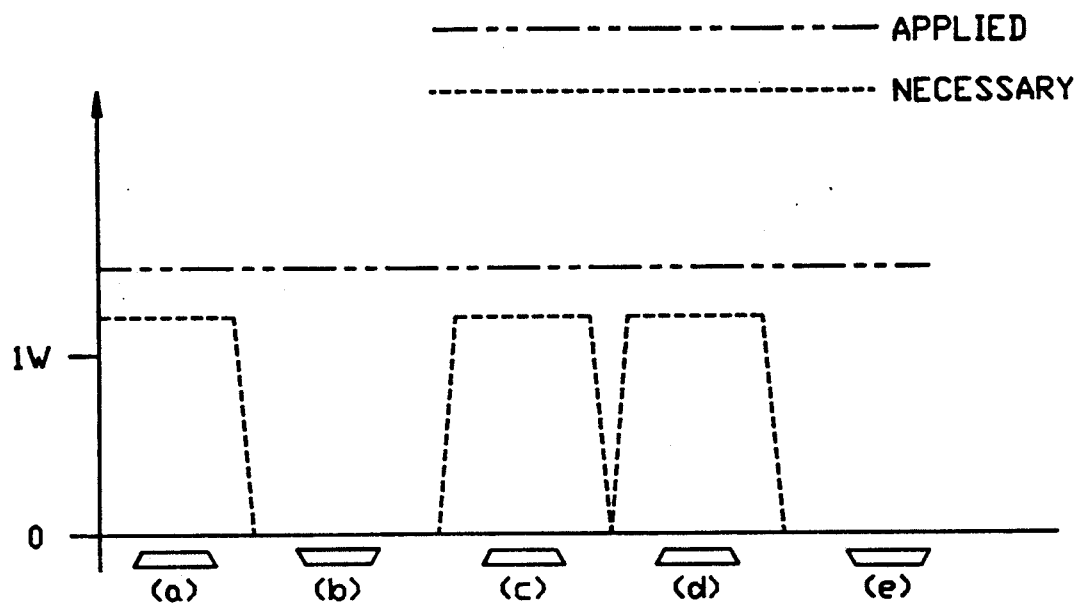
FIG. 7a is an illustration showing the force necessary and applied to the designated article by many prior art devices.
Figure 7B:
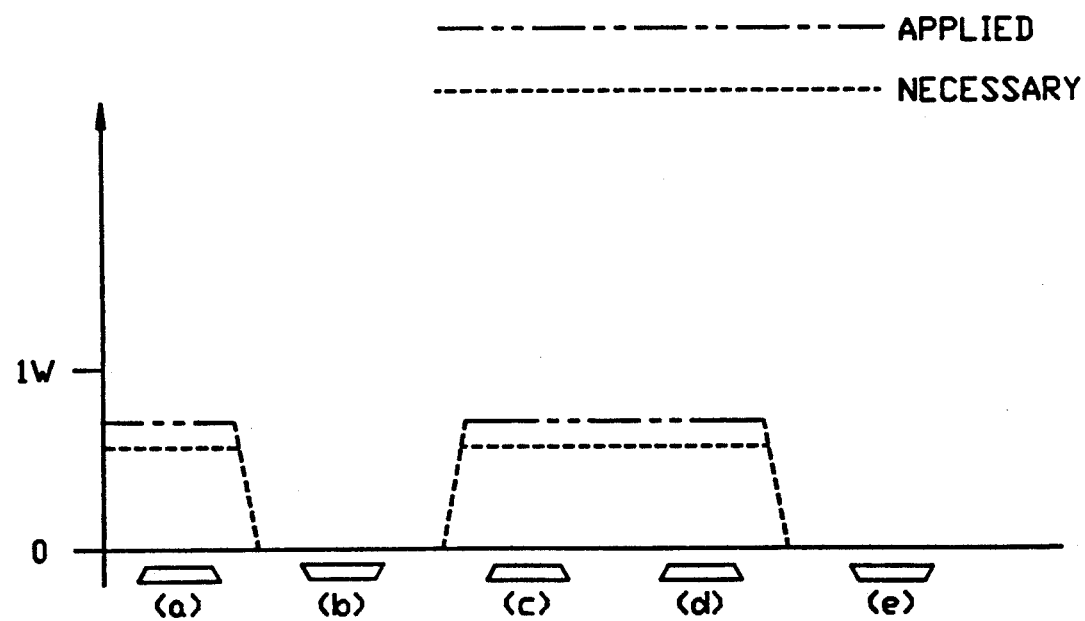
FIG. 7b is an illustration showing the force necessary and applied to the designated article by the present invention.

Referring now to FIGS. 7a and 7b, this distinction is more clearly explained. While the force necessary to orient each article varies because some articles are already properly oriented, many devices of the prior art indiscriminately apply the same force to each. Essentially through the present invention, one need only assist the force of gravity in the event that article (20) is to be flipped, or merely resist gravity momentarily for properly oriented articles. On the subject of the latter, the present embodiment controls the "nose dive" tendency with a bottom stabilizing air to balance the force of gravity. Both top air solenoid (15) and bottom air solenoid (22) may be continuous or intermittent, with forces (in terms of p.s.i.) which may vary according to the weight and size of article (20). In the present embodiment, an improperly oriented article triggers the activation of air solenoid (15) and the deactivation of air solenoid (22). The positioning and number of each air solenoid may, of course, be different if flipping is to occur about an axis other than X—X as shown in FIG. 4.

The present invention not only has a smaller necessary force (the minimum force required to flip an article), but it has a greater possible applied force. For elements (a), (c) and (d) of FIG. 7A the necessary force to flip these articles is slightly less than the depicted applied force. However, the depicted applied force must be less than the necessary force to flip elements (b) and (e) (not shown). This is not a problem for the present invention, illustrated in FIG. 7B, since the applied force is exerted on only improperly oriented articles. This benefit is due to the ability to detect improperly oriented articles. Many prior art devices must work within a narrow force range in order to be effective—too much and all articles flip, but too little and none of the articles will flip. The present invention is able to apply an inordinate amount of force, much greater than the necessary force, if so desired. This high volume air blast from air solenoid (15) may thus assist in speeding up the orienting process.

As discussed earlier, the arrangement of first surface (12) with second surface (13) may also facilitate the flipping action. By increasing space (14) article (20) may flip sufficiently in free fall. In such a case, it may be desirable to utilize the natural "nose dive" tendencies (due to gravity) of article (20) without a separate flipping air solenoid (15). For instance, article (20) could be released from surface (12) at approximately −35° (measured from the plane of surface (12)). Momentum could then be allowed to carry article (20) to a final orientation of less than −90°. Similarly, by lowering the angle of surface (12) to −35° (measured from the plane of the original position of surface (12) the same effect may be accomplished. Raising the angle of inclination of second surface (13) without any other adjustments may still require the use of air solenoid (15).

Figure 3:
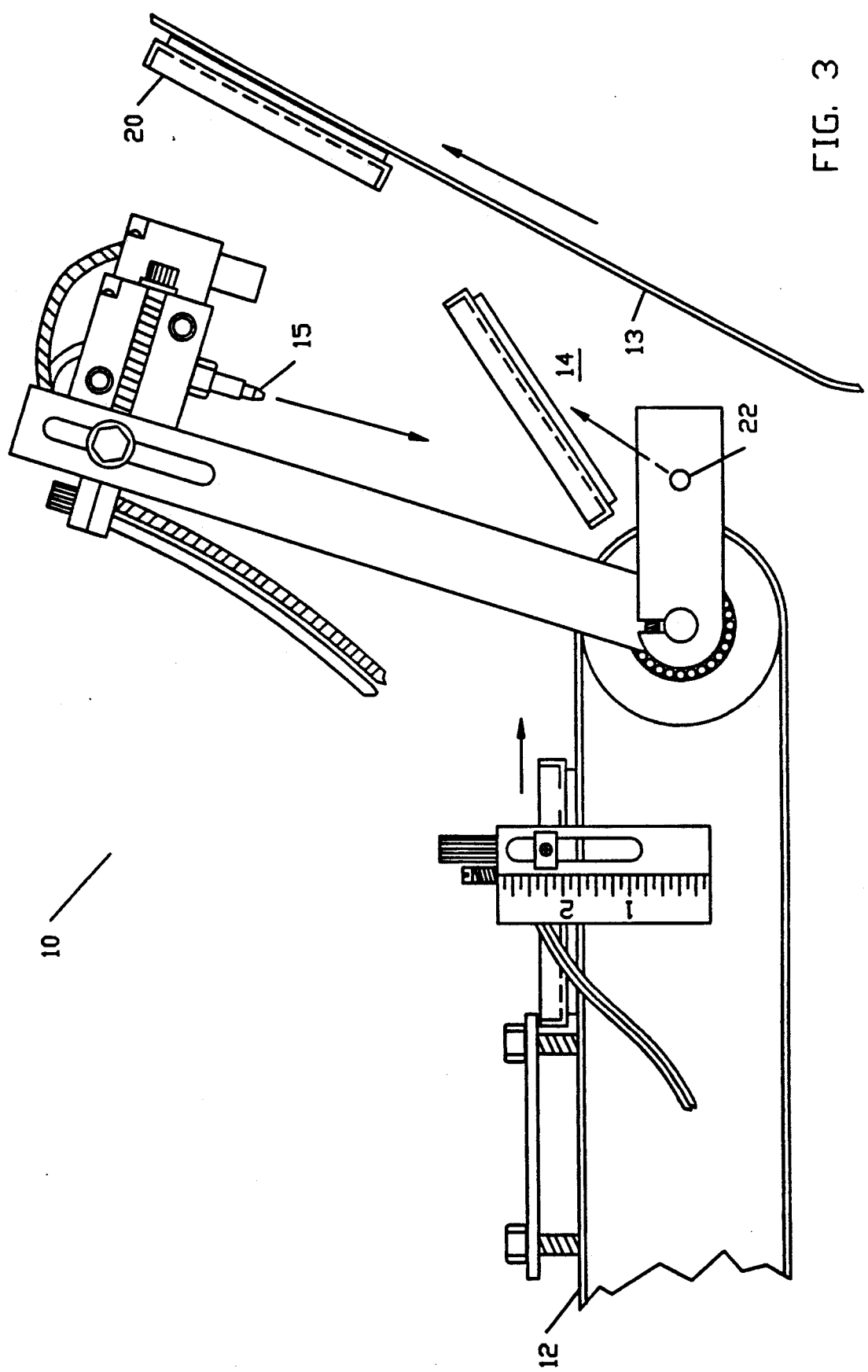
FIG. 3 is another side view of the embodiment shown in FIG. 1 illustrating the continued flow of stabilizing air as properly oriented articles are transported to the second surface.

A further element which assists flipping is radius (17) of first surface (12), shown in FIG. 3. As article (20) reaches the discharge end of surface (12) it is guided by radius (17) into a potential flipping action. The present embodiment of flipper apparatus (10) will release article (20) at approximately a −35° angle (measured from the plane of surface (12)). This means that article (20) need only be rotated another 55° to result in a changed orientation. While certainly a simple standard or squared end having no radius will work, the resulting "nose dive" may be slightly more difficult to control. Once again, the supply of a flipping air by solenoid (15), or a stabilizing air by solenoid (22) may also be incorporated, separately or in combination.

Another potential flipping force may be supplied by the vacuum of surface (12) in combination with radius (17). Presently, article (20) is taken but a short distance about radius (17) to begin the flipping motion. However, it is anticipated that by causing article (20) to continue further about radius (17) by a prolonged adherence to surface (12) the flipping action may be completed as well. That is, article (20) could be carried around radius (17) until it reaches an angle of just greater than −90° (measured from the plane of surface (12)), where it could be discharged to second surface (13). The prolonged adherence may be accomplished by the vacuum, or by other known means.

Naturally, radius (17), air solenoid (15), air solenoid (22), vacuum, gravity, and the arrangement of first surface (12) with second surface (13) may be used individually or in countless combinations to cause improperly oriented articles (20) to flip. While not claimed in all such combinations for practicalities' sake, such permutations and combinations naturally fall within the scope of this patent.

While the flipping action of the present apparatus (10) is unique in the field, its ability to detect improperly oriented articles is likewise distinctive. Referring to FIG. 6, some basic cross-sections of various articles can be seen. In all cases, articles (20) must have distinguishable tops (aa) and bottoms (bb) whether by location, distance, shape, color, and the like. Typically, most articles are in the form of cross-section (B). Because of the obvious difference between top (aa) and bottom (bb) many prior art devices are able to set air flow forces at an amount to allow only one-way flipping—that is, flipping from side (aa) to side (bb) but not from side (bb) to side (aa). The present invention is designed to accomplish two-way flipping, and goes one step further to provide the ability to flip articles such as (A) and (C).

Figure 5:
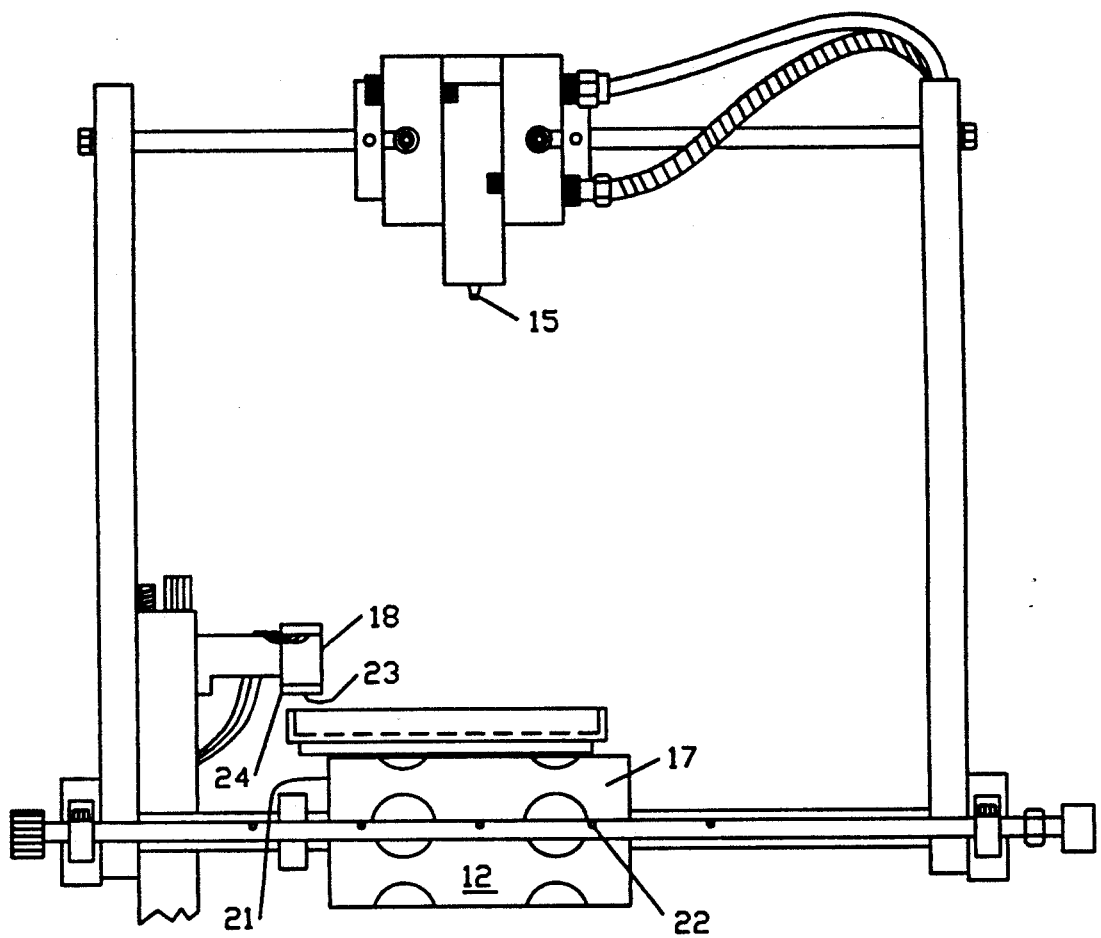
FIG. 5 is a front view of the first surface showing the positioning of an electronic sensor.

FIG. 5 shows flipper apparatus (10) with in-line mounted sensor (18). In the embodiment shown, sensor (18) acts as the means for detecting improperly oriented articles, which allows selective changing to occur. It has two components for sensing a height or distance—emitter (23) and receiver (24). By placing sensor (18) above edge (21) it may detect the orientation of the skirt on each article (20). In operation, emitter (23) transmits light beams onto one of the two opposing sides of article (20). In the present embodiment, if article (20) is oriented (aa) side down the light beams will be reflected onto receiver (24). This causes air solenoid (15) to activate for approximately 0.5 seconds, and air solenoid (22) to deactivate for approximately 0.5 seconds, thus flipping an improperly oriented article (20) as it moves to second surface (13). Certainly other time intervals are possible. In the case where articles (20) are oriented (bb) side down the emitted light beams will deflect without being received by receiver (24). At this point air solenoid (22) will continue issuing stabilizing air to the correctly oriented article. Air solenoid (15) will remain idle. Naturally, some wiring changes would allow the converse of the above described procedure, however, it is presently thought to be more efficient to move sensor (18) to the opposite side (above or below) of first surface (12). While the accompanying drawings shows sensor (18) positioned above edge (21) it is certainly possible to place sensor (18) almost anywhere above or below first surface (12). This aspect will allow two-way flipping. In the present embodiment, sensor (18) is attached to a movable device which allows sensor (18) to be adjusted both vertically and horizontally for set-up purposes so that the entire device can accommodate a variety of articles.

It is anticipated by the present invention to use more advanced sensors to detect distinguishing aspects such as color, shading, printing, reflectance, or the like. This would allow the present invention to properly orient articles such as (A) and (C) shown in FIG. 6. Since no physical differences may exist between the opposing sides, such as a skirt in lids, it may be desirable to detect colors to orient all similarly colored sides in the same direction.

For other applications, articles (20) may already be oriented in one direction, but it may be desired to flip them to the opposing orientation. In such an instance it would not be necessary to detect the orientation of each article (20) since it is already known. Instead, air solenoid (15) may be run continuously to flip each article (20) at radius (17). Even completely flat articles may be flipped with complete accuracy using flipper apparatus (10).

Referring now to FIG. 3, other important elements of the present invention can be understood. Without some preventative measures many improperly oriented articles could be flipped onto previous properly oriented articles causing overlap. The present embodiment incorporates two such preventative measures. The first relates to the direction of issuing a stabilizing air. By aiming air solenoid (22) in a slight horizontal direction, toward second surface (13), each properly oriented article (20) is propelled in this direction. This creates a greater spacing between it and the ensuing article (20). In the event that this article is improperly oriented it can be flipped without overlapping the previous article (20) by discontinuing the stabilizing air solenoid (22) for improperly oriented articles.

The second preventive measure relates to the speed of travel of first surface (12) and second surface (13). By running second surface (13) at a speed slightly greater than the operating speed of first surface (12) the spacing between consecutive articles is increased. This provides an extra increment of tolerance for flipper apparatus (10) to operate.

The foregoing discussion and the claims which follow describe the preferred embodiments of the present invention. Particularly with respect to the claims, it should be understood that changes may be made without departing from its essence. In this regard, it is intended that such changes would still fall within the scope of the present invention. It simply is not practical to describe and claim all possible revisions to the present invention which may be accomplished. To the extent such revisions utilize the essence of the present invention, each would naturally fall within the breadth of protection encompassed by this patent. This is particularly true for the present invention since its basic concepts and understandings are fundamental in nature and can be broadly applied.

We claim:

1. A method of automatically orienting a plurality of predominately flat articles having two opposed sides comprising the steps of:
   a. determining the desired orientation for said articles; then
   b. automatically feeding each article onto a first surface; then
   c. detecting improperly oriented articles; then
   d. moving each said article to a second surface; while
   e. selectively changing the orientation of each said article which is improperly oriented, wherein said step of selectively changing comprises the steps of:
      (1) receiving a signal communicating an improper orientation of said article; then
      (2) flipping said article; while
   f. stabilizing properly oriented articles, wherein said step of stabilizing comprises utilizing an air flow from below said article.

2. A method of automatically orienting a plurality of predominately flat articles as described in claim 1 wherein said step of flipping comprises the step of discontinuing said air flow.

3. A method of automatically orienting a plurality of predominately flat articles having two opposed sides comprising the steps of:
   a. determining the desired orientation for said articles; then b. automatically feeding each article onto a first surface; then c. detecting improperly oriented articles; then d. moving each said article to a second surface; while e. selectively changing the orientation of each said article which is improperly oriented, wherein said step of selectively changing comprises the steps of:
   (1) receiving a signal communicating an improper orientation of said article; then
   (2) flipping said article, wherein said step of flipping comprises the step of issuing an air flow from above said article.

4. A method of automatically orienting a plurality of predominately flat articles as described in claim 1 or 3 and further comprising the step of avoiding overlap of said articles.

5. A method of automatically orienting a plurality of predominately flat articles as described in claim 4 wherein said step of avoiding comprises the step of operating said second surface at a speed greater then the operating speed of said first.

6. A method of automatically orienting a plurality of predominately flat articles as described in claim 1 or 3 and further comprising the step of maintaining the orientation of properly oriented articles.

7. A method of automatically orienting a plurality of predominately flat articles as described in claim 6 wherein said step of maintaining comprises the step of avoiding overlap of said articles.

8. A method of automatically orienting a plurality of predominately flat articles as described in claim 7 wherein said step of avoiding comprises the step of operating said second surface at a speed greater than the operating speed of said surface.

9. A method of automatically orienting a plurality of predominately flat articles as described in claim 7 wherein said step of avoiding comprises the step of applying a propelling force to properly oriented articles.

10. A method of automatically orienting a plurality of predominately flat articles as described in claim 9 wherein said step of applying comprises utilizing an air flow from below said article.

11. A method of automatically orienting a plurality of predominately flat articles as described in claim 6 wherein said step of maintaining comprises the step of stabilizing said articles.

12. A method of automatically orienting a plurality of predominately flat articles as described in claim 11 wherein said step of stabilizing comprises utilizing an air flow from below said article.

13. A method of automatically orienting a plurality of predominately flat articles as described in claim 1 or 3 wherein said first surface has a radius at the discharge end, said method further comprising the step of retaining said articles over said radius.

14. A method of automatically orienting a plurality of predominately flat articles as described in claim 13 wherein said step of changing comprises the step of retaining each improperly oriented article over said radius.

15. A method of automatically orienting a plurality of predominately flat articles as described in claim 1 or 3 and further comprising the step of stacking said articles after moving to said second conveying surface.

16. A method of automatically orienting a plurality of predominately flat articles as described in claim 1 or 3 wherein said step of selectively changing comprises the step of exerting a force upon said improperly oriented articles wherein said force exerted is less than the weight of said article.

17. An apparatus for orienting a plurality of predominately flat articles each having top and bottom sides comprising:
   a. a first surface for conveying each article, said surface having a discharge end;
   b. a second surface also for conveying each article, said second surface having a receiving end, and wherein said receiving end is proximal to said discharge end of said first surface;
   c. a means for detecting improperly oriented articles; and
   d. a means, responsive to said means for detecting, for selectively changing the orientation of said articles,
   e. a means for transporting each said article from said first surface to said second surface;
   f. a means for stabilizing said articles, wherein said means for changing comprises a means for disrupting said means for stabilizing, and wherein said means for stabilizing comprises at least one air jet.

18. An apparatus for orienting a plurality of predominately flat articles as described in claim 17 wherein said air jet is positioned below said discharge end of said first surface.

19. An apparatus for orienting a plurality of predominately flat articles as described in claim 17 wherein said means for changing comprises a means for issuing an air flow.

20. An apparatus for orienting a plurality of predominately flat articles as described in claim 19 wherein said means for issuing an air flow is positioned above said first surface.

21. An apparatus for orienting a plurality of predominately flat articles as described in claim 20 wherein said means for issuing comprises at least one air solenoid.

22. An apparatus for orienting a plurality of predominately flat articles as described in claim 21 wherein said means for issuing an air flow supplies a force sufficient for flipping said article, and wherein said sufficient force is less than the weight of said article.

23. An apparatus for orienting a plurality of predominately flat articles as described in claim 17 and further comprising a means for preventing overlap of said articles.

24. An apparatus for orienting a plurality of predominately flat articles each having top and bottom sides comprising:
   a. a first surface for conveying each article, said surface having a discharge end;
   b. a second surface also for conveying each article, said second surface having a receiving end, and wherein said receiving end is proximal to said discharge end of said first surface;
   c. a means for detecting improperly oriented articles; and
   d. a means, responsive to said means for detecting, for selectively changing the orientation of said articles,
   e. a means for preventing overlap of said articles wherein said means for preventing overlap comprises an air jet.

25. An apparatus for orienting a plurality of predominately flat articles as described in claim 23 wherein both first and second surfaces operate at a speed and wherein said means for preventing overlap comprises the speed of said second surface to be greater than the speed of said first surface.

26. An apparatus for orienting a plurality of predominately flat articles as described in claim 25 wherein said second surface is a vacuum belt surface.

27. An apparatus for orienting a plurality of predominately flat articles as described in claim 17 or 24 and further comprising a means for preserving the orientation of properly oriented articles.

28. An apparatus for orienting a plurality of predominately flat articles as described in claim 27 wherein said means for preserving comprises a means for preventing overlap.

29. An apparatus for orienting a plurality of predominately flat articles as described in claim 28 wherein both first and second surfaces operate at a speed and wherein said means for preventing overlap comprises the speed of said second surface to be greater than the speed of said first surface.

30. An apparatus for orienting a plurality of predominately flat articles as described in claim 29 wherein said second surface is a vacuum belt surface.

31. An apparatus for orienting a plurality of predominately flat articles as described in claim 27 wherein said means for preserving comprises a means for stabilizing said articles.

32. An apparatus for orienting a plurality of predominately flat articles each having top and bottom sides comprising:
 a. a first surface for conveying each article, said surface having a discharge end;
 b. a second surface also for conveying each article, said second surface having a receiving end, and wherein said receiving end is proximal to said discharge end of said first surface;
 c. a means for detecting improperly oriented articles; and
 d. a means, responsive to said means for detecting, for selectively changing the orientation of said articles,
 e. a means for preserving the orientation of properly oriented articles wherein said means for preserving comprises a means for stabilizing said articles, and wherein said means for stabilizing comprises at least one air jet.

33. An apparatus for orienting a plurality of predominately flat articles as described in claim 19 wherein said discharge end of said first surface has a radius.

34. An apparatus for orienting a plurality of predominately flat articles as described in claim 33 wherein said means for issuing an air flow is above said radius.

35. An apparatus for orienting a plurality of predominately flat articles as described in claim 17, 24, or 32 wherein said means for changing comprises a necessary force exerted on only improperly oriented articles.

36. An apparatus for orienting a plurality of predominately flat articles as described in claim 35 wherein said means for changing comprises an applied force exerted on only improperly oriented articles, and wherein said applied force is substantially greater than said necessary force.

37. An apparatus for orienting a plurality of predominately flat articles as described in claim 35 wherein said necessary force exerted is less than the weight of said article.

38. An apparatus for orienting a plurality of predominately flat articles as described in claim 37 wherein said force is exerted while said article is in free space.

39. An apparatus for orienting a plurality of predominately flat articles as described in claim 17, 24 or 32 wherein said first surface has at least one edge, and wherein said apparatus further comprises a means for comprises a means for positioning said articles slightly over the edge of said first surface.

40. An apparatus for orienting a plurality of predominately flat articles as described in claim 39 wherein said means for detecting is positioned along said edge of said first surface.

41. An apparatus for orienting a plurality of predominately flat articles as described in claim 40 wherein said means for detecting comprises an electronic sensor.

42. A method of automatically orienting a plurality of predominately flat articles having two opposed sides comprising the steps of:
 a. determining the desired orientation for said articles; then
 b. automatically feeding each article onto a first surface; then
 c. detecting improperly oriented articles, wherein said step of detecting comprises the steps of:
  (1) emitting light beams onto at least one side of each said article; then
  (2) selectively receiving certain of said light beams as they are reflected from the sides of each said article; then
 d. moving each said article to a second surface; while
 e. selectively changing the orientation of each said article which is improperly oriented, wherein said step of selectively changing comprises the steps of:
  (1) receiving a signal communicating an improper orientation of said article; then
  (2) flipping said article; then
 f. stabilizing properly oriented articles, wherein said step of stabilizing comprises utilizing an air flow from below said article.

43. A method of automatically orienting a plurality of predominately flat articles having two opposed sides comprising the steps of:
 a. determining the desired orientation for said articles; then
 b. automatically feeding each article onto a first surface; then
 c. detecting improperly oriented articles, wherein said step of detecting comprises the steps of:
  (1) emitting light beams onto at least one side of each said article; then
  (2) selectively receiving certain of said light beams as they are reflected from the sides of each said article; then
 d. moving each said article to a second surface; while
 e. selectively changing the orientation of each said article which is improperly oriented, wherein said step of selectively changing comprises the steps of:
  (1) receiving a signal communicating an improper orientation of said article; then
  (2) flipping said article, wherein said step of flipping comprises the step of issuing an air flow from above said article.

* * * * *